UNITED STATES PATENT OFFICE.

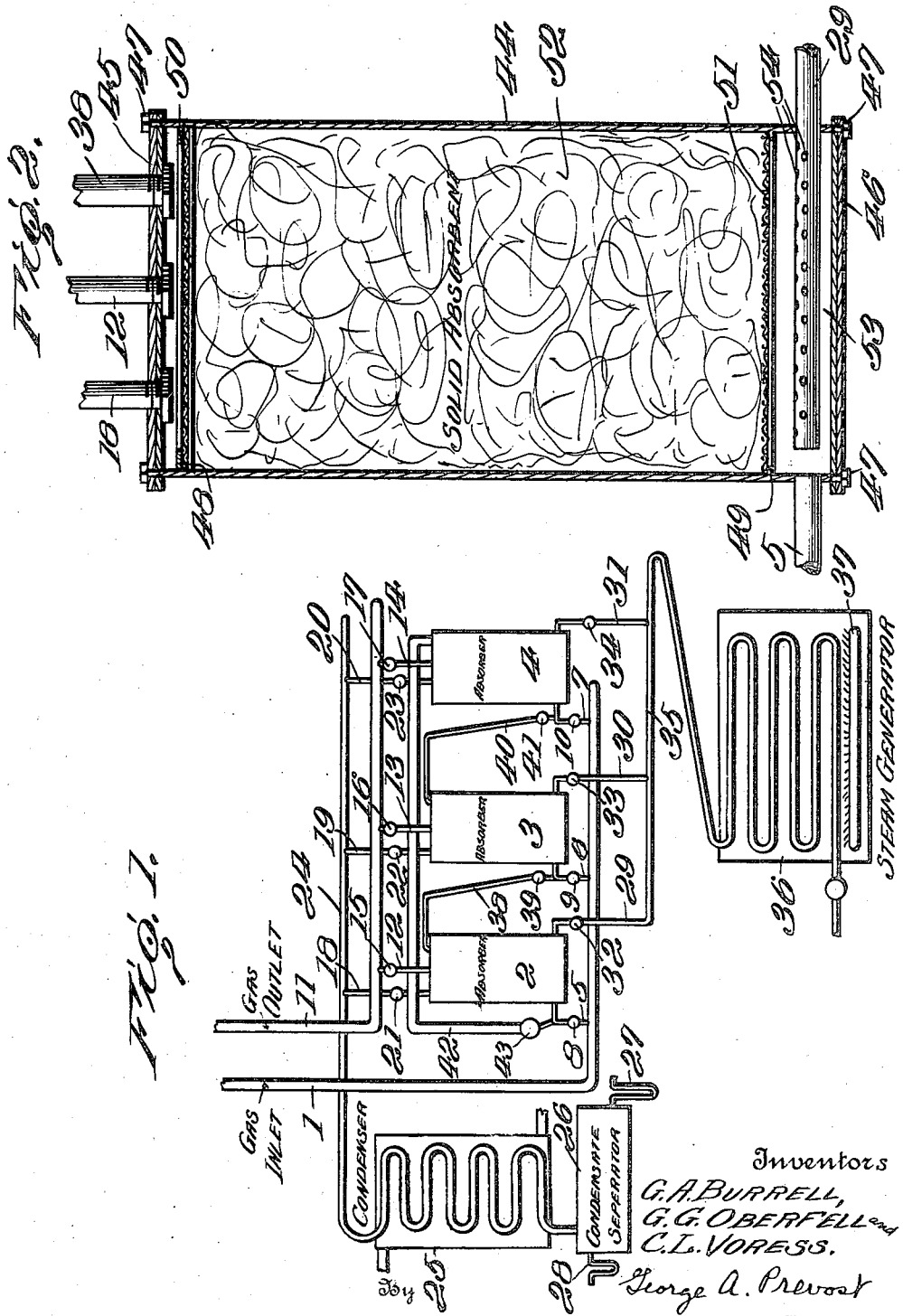

GEORGE A. BURRELL, OF NEW YORK, N. Y., GEORGE G. OBERFELL, OF TULSA, OKLAHOMA, AND CLYDE L. VORESS, OF BRADFORD, PENNSYLVANIA, ASSIGNORS TO GASOLINE RECOVERY CORPORATION, A CORPORATION OF DELAWARE.

APPARATUS FOR EXTRACTING VAPORS FROM GASEOUS MIXTURES.

1,402,340.     Specification of Letters Patent.     Patented Jan. 3, 1922.

Application filed June 18, 1920. Serial No. 389,954.

*To all whom it may concern:*

Be it known that we, GEORGE A. BURRELL, GEORGE G. OBERFELL, and CLYDE L. VORESS, citizens of the United States, residing in the city of New York, county of New York, and State of New York, in Tulsa, in the county of Tulsa and State of Oklahoma, and in Bradford, in the county of McKean and State of Pennsylvania, respectively, have invented certain new and useful Improvements in Apparatus for Extracting Vapors from Gaseous Mixtures; and we do hereby declare the following to be a full, clear, and exact description of the invention, such as will enable others skilled in the art to which it appertains to make and use the same.

This invention relates to improvements in apparatus for extracting vapors from gaseous mixtures by the absorption system.

The principal object of the invention is to provide an apparatus including solid absorbing media and means for introducing steam or analogous vapor directly into the absorbing media for distilling vapors from the same.

Another object of the invention is to furnish an apparatus of the above character having a number of units connected together by valved piping which permits distillation to be practiced in one unit while absorption is taking place in other units.

A further object is to provide a system by which selective absorption may be practiced.

With the foregoing objects outlined and with other objects in view, the invention consists in the novel features hereinafter described in detail, illustrated in the accompanying drawing, and more particularly set forth in the claims.

Referring to the drawing:—

Fig. 1 is a diagrammatic view of the improved apparatus.

Fig. 2 is an enlarged vertical sectional view of one of the absorber units.

In the drawing 1 designates a gas inlet pipe for conveying vapor carrying gas to the absorbing units 2, 3 and 4. This pipe is connected to the absorbers by conduits 5, 6 and 7 having valves 8, 9 and 10.

Gas leaving the absorbers is conveyed by an outlet pipe 11, which is connected to the top of the units by conduits 12, 13 and 14 having valves 15, 16 and 17.

Vapor outlet pipes 18, 19 and 20 having valves 21, 22 and 23 extend upwardly from the absorber units and are connected to a common pipe 24, which conducts the vapors to a condenser 25 that empties into a gravity condensate separator 26 having a water outlet trap pipe 27 and a recovered vapor condensate outlet trap pipe 28.

Steam inlet pipes 29, 30 and 31 having valves 32, 33 and 34, extend from the lower portions of the absorber units and are connected to a common pipe 35, which conducts steam to the absorbers from a steam generator 36 having a suitable heating element 37.

Units 2 and 3 communicate through a pipe 38, having a valve 39, which places the top of absorber 2 in communication with the bottom of absorber 3.

Units 3 and 4 are connected by a similar pipe 40 having a valve 41. A pipe 42 having a valve 43, connects the top of unit 4 to the lower portion of absorber 2.

Each absorbing unit, as shown in Fig. 2, consists of a tubular or hollow body 44 having a removable cover 45 and a removable bottom 46 connected to the body by threaded studs and nuts 47.

The body is provided with an internal flange or shoulder 49 on which rests a supporting screen or porous partition 51. Resting on the screen is a body 52 of solid absorbing medium, such as activated charcoal, silica gel or the like, and resting on the upper surface of the absorbing body is a reticulated partition 50 having a weight 48 which causes it to follow the mass as it settles. This screen must rest directly on top of the body 52 to prevent moving which would powder the absorbing media.

For the purpose of the following short description, it will be assumed that the unit in Fig. 2 is the absorber 2 of the other figure.

The screen or porous partition 51 is arranged above the bottom 46 to provide a compartment 53 into which the gas pipe 5 and the steam pipe 29 lead. It will be seen that the steam pipe extends diametrically across the compartment 53 and has longitudinal series of apertures 54 to spray steam over the entire under side of the body or mass of absorbing medium.

The screen 50 is arranged a slight distance below the top 45 to provide a chamber 55 and the pipes 18, 12 and 38 lead from this chamber.

In using the apparatus, gas containing the vapors to be extracted or recovered, is preferably passed by way of pipe 1 through 5, 2, 38, 3, 13 and 11. As the gas passes through the absorbers 2 and 3, the solid absorbent will extract the vapors carried by the gas and the gas when it reaches pipe 13 will be denuded of vapors. When the medium in unit 2 is fully impregnated or saturated, valves 8, 39 and 16 are closed and valves 9, 41 and 17 are opened. The gas then travels through 6, 3, 40, 4, 14 and 11.

During the period of absorption in units 3 and 4, valves 21 and 32 are opened and this permits steam from the generator 36 to pass through absorber 2 and distill the vapors therefrom. The gas vapors and the steam then pass by way of pipe 24 to the condenser where the gas and aqueous vapors are condensed and flow into the gravity separator.

About the time the absorbent in unit 3 is saturated or impregnated with gas vapors, the vapors in unit 2 have been removed from the absorbent in that unit and the solid absorbent in 2, owing to the steam treatment is left very hot. Due to the heat, this absorber is not in condition to receive gas directly from the pipe 1 as the hot absorbent would not effectively absorb the gas vapors, but if the gas has been previously passed through an absorber unit, then the gas is somewhat cooled and it will act to cool the absorbent in the unit, which has previously been subjected to the steam treatment. We take advantage of this fact to solve cooling of the absorbent without cutting any unit out of the system for any length of time. Therefore, continuing with the process, valves 9, 41 and 17 are closed and valves 10, 43 and 15 are opened. The gas then passes from pipe 1 through 7, 4, 42, 2 and 12 to the outlet 1 and as it is passed through unit 2 it effectively cools the absorbent in this unit.

While absorption is taking place in units 4 and 2, the vapors in unit 3 will be distilled off in a manner which is apparent. This cycle is followed indefinitely.

While we have mentioned in connection with the process, that the absorbing media is impregnated, saturated, fully impregnated, fully saturated, etc., it may be stated that the general idea is to saturate or impregnate the absorbing media to a point where the process becomes commercially profitable.

It is a fact that when mixed gas containing fractions of different volatility, are subjected to absorption media such as activated charcoal, silica gel, mixtures of the same, or other solid absorbent, material of a very wide range of volatility is absorbed. As larger quantities of the gas mixture are passed through the absorbent, the more volatile are again volatilized and the less easily volatilized ones are selected to replace them. Therefore, by properly regulating the valves of the present apparatus, the volume and rate of the mixed flow may be controlled to take advantage of selective absorption. This regulation is of extreme importance, as it permits more stable products having lower vapor tension to be obtained than would otherwise be possible.

While we have described the passage of the gas and steam as traveling upwardly through the absorbing media, we have found that by passing the steam downwardly, instead of upwardly, we are enabled to effect a material saving in steam. We believe this is due to the fact that condensed water drains through the charcoal and does not have to be re-volatilized, as it does in the case where the steam is passing upward. Therefore, we do not wish to limit the present case to the passage of the gas or steam in any particular direction.

What we claim and desire to secure by Letters Patent is:—

1. An absorbing tower comprising a body having a removable top and bottom, solid absorbent medium located in the tower, gas inlets and outlets leading into the tower, a vapor outlet, and a steam conducting pipe extending into the tower for introducing steam into said absorbent medium.

2. An absorbing tower comprising a tubular body having a removable top and bottom, porous partitions located in the body and spaced from the top and bottom, a mass of solid absorbent medium located between the partitions, a gas inlet and a steam inlet leading into the tower below one of the partitions, and a gas outlet and a vapor outlet extending from the tower above the other partition.

3. An apparatus for extracting vapors from gases comprising a plurality of absorbing units, solid absorbing media contained in each unit, a gas inlet pipe, a valved conduit connecting said pipe to the lower portion of each of said units, a gas outlet pipe, a valved conduit connecting the top portion of each unit to said outlet pipe, a condenser having a vapor conducting pipe, a valved conduit connecting the top portion of each unit to said vapor pipe, a valved conduit connecting the upper portion of each unit to the lower portion of another unit, a steam generator having a steam conducting pipe, and a valved conduit for each absorber connected to the steam pipe and extending into the absorbent media in each unit.

In testimony whereof, we affix our signatures.

GEORGE A. BURRELL.
GEORGE G. OBERFELL.
CLYDE L. VORESS.